(12) United States Patent
Jonas et al.

(10) Patent No.: US 8,929,873 B2
(45) Date of Patent: Jan. 6, 2015

(54) METHODS AND APPARATUSES FOR INITIATING MULTI-MODE SYSTEM SELECTION AT USER EQUIPMENT POWER UP

(75) Inventors: Anisha E. Jonas, San Diego, CA (US); Wei Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/599,471

(22) Filed: Aug. 30, 2012

(65) Prior Publication Data
US 2013/0231098 A1   Sep. 5, 2013

Related U.S. Application Data

(60) Provisional application No. 61/591,374, filed on Jan. 27, 2012.

(51) Int. Cl.
*H04W 8/22* (2009.01)
*H04W 8/20* (2009.01)
*H04W 8/18* (2009.01)
*H04W 88/06* (2009.01)

(52) U.S. Cl.
CPC ............... *H04W 8/22* (2013.01); *H04W 88/06* (2013.01); *H04W 8/205* (2013.01); *H04W 8/183* (2013.01)
USPC ....................................... 455/418; 455/552.1

(58) Field of Classification Search
USPC ............................ 455/418, 456.6, 552.1, 558
See application file for complete search history.

(56) References Cited

U.S. PATENT DOCUMENTS

| 5,754,542 A | 5/1998 | Ault et al. |
| 6,766,169 B2 | 7/2004 | Cooper |
| 8,078,132 B2 | 12/2011 | Wang |
| 2008/0182615 A1* | 7/2008 | Xue et al. ................... 455/552.1 |
| 2009/0258649 A1 | 10/2009 | Salowey |
| 2010/0015978 A1 | 1/2010 | Yoon et al. |
| 2011/0003590 A1 | 1/2011 | Yoon et al. |
| 2011/0092208 A1 | 4/2011 | Swaminathan et al. |
| 2012/0003958 A1 | 1/2012 | Hossain et al. |

FOREIGN PATENT DOCUMENTS

| EP | 1885141 A1 | 2/2008 |
| WO | 2005117463 A2 | 12/2005 |
| WO | 2010118379 | 10/2010 |
| WO | 2010132710 | 11/2010 |

OTHER PUBLICATIONS

International Search Report and Written Opinion—PCT/US2013/023168—ISA/EPO—May 23, 2013.

* cited by examiner

*Primary Examiner* — Myron K Wyche
(74) *Attorney, Agent, or Firm* — Donald C. Kordich

(57) ABSTRACT

The present disclosure presents methods and apparatuses for managing Multimode System Selection in one or more user equipment in a wireless system. According to some aspects of the present disclosure, such a method may include discovering whether a user equipment (UE) contains at least one 3GPP network subscription and at least one 3GPP2 network subscription, determining whether 3GPP2 network subscription information is stored on a Universal Integrated Circuit Card (UICC) or a nonvolatile memory (NV) associated with the UE where the UE contains at least one 3GPP network subscription and at least one 3GPP2 network subscription, and performing a read operation on one or both of the UICC and NV to obtain one or more Multimode System Selection (MMSS) base files based on the determining.

24 Claims, 10 Drawing Sheets

US 8,929,873 B2

METHODS AND APPARATUSES FOR INITIATING MULTI-MODE SYSTEM SELECTION AT USER EQUIPMENT POWER UP

CLAIM OF PRIORITY UNDER 35 U.S.C. §119

The present Application for Patent claims priority to Provisional Application No. 61/591,374 entitled "Methods to Initiate Multimode System Selection (MMSS) on UE Powerup" filed Jan. 27, 2012, and assigned to the assignee hereof and hereby expressly incorporated by reference herein.

BACKGROUND

1. Field

Aspects of the present disclosure relate generally to wireless communication systems, and more particularly to optimizing subscription information location and loading procedures for devices in multi-mode systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Multimode mobile devices or user equipment (UE) refer to mobile phones that are compatible with more than one form of data transmission or network, as contrasted with single-mode mobiles, which are compatible with just one form of data transmission or network. For instance, a dual-mode phone can be a telephone which uses more than one technique for sending and receiving voice and data.

For Multi-Mode System Selection (MMSS) operations in wireless devices, the device, which may be referred to as a (UE), must contain a base set of files for network provisioning. In some aspects, these files may be related to a Preferred Roaming List (PRL), a Public Land Mobile Network (PLMN) Selector, MMSS System Priority List (MSPL), MMSS Location Associated Priority List (MLPL), and the like. Initial deployments of MMSS assume that all of these initial provisioning files are present in a UE Universal Integrated Circuit Card (UICC) along with CDMA subscription information. Where any of these files are not present, the UE may not commence MMSS operations. In new deployments of MMSS, however, it is possible that some of the provisioning files are present on the UICC and others are present on a nonvolatile memory (NV) on the UE. Additionally, in these newer deployments, it is possible for CDMA subscription information to reside either on the UICC or the NV.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents example methods and apparatuses for optimizing subscription information location and loading procedures for devices in multi-mode systems. For example, the disclosure presents a method for device provisioning, which may include discovering whether a UE contains at least one 3GPP network subscription and at least one 3GPP2 network subscription, determining whether 3GPP2 network subscription information is stored on a UICC or an NV associated with the UE where the UE contains at least one 3GPP network subscription and at least one 3GPP2 network subscription, and performing a read operation on one or both of the UICC and NV to obtain one or more MMSS base files based on the determining.

Furthermore, the disclosure presents an apparatus for device provisioning which may include means for discovering whether a UE contains at least one 3GPP network subscription and at least one 3GPP2 network subscription, means for determining whether 3GPP2 network subscription information is stored on a UICC or an NV associated with the UE where the UE contains at least one 3GPP network subscription and at least one 3GPP2 network subscription, and means for performing a read operation on one or both of the UICC and NV to obtain one or more MMSS base files based on the determining.

In addition, the disclosure presents a computer-readable medium, which may include stored code for discovering whether a UE contains at least one 3GPP network subscription and at least one 3GPP2 network subscription, determining whether 3GGP2 network subscription information is stored on a UICC or an NV associated with the UE where the UE contains at least one 3GPP network subscription and at least one 3GPP2 network subscription, and performing a read operation on one or both of the UICC and NV to obtain one or more MMSS base files based on the determining.

Moreover, the present disclosure provides an apparatus for device provisioning, which may include a subscription determining component configured to discover whether a UE contains at least one 3GPP network subscription and at least one 3GPP2 network subscription, a subscription information location determining component configured to determine whether 3GPP2 network subscription information is stored on a UICC or an NV associated with the UE where the UE contains at least one 3GPP network subscription and at least one 3GPP2 network subscription, and a file reading component configured to perform a read operation on one or both of the UICC and NV to obtain one or more MMSS base files based on the determining of the subscription information location determining component.

These and other aspects of the disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
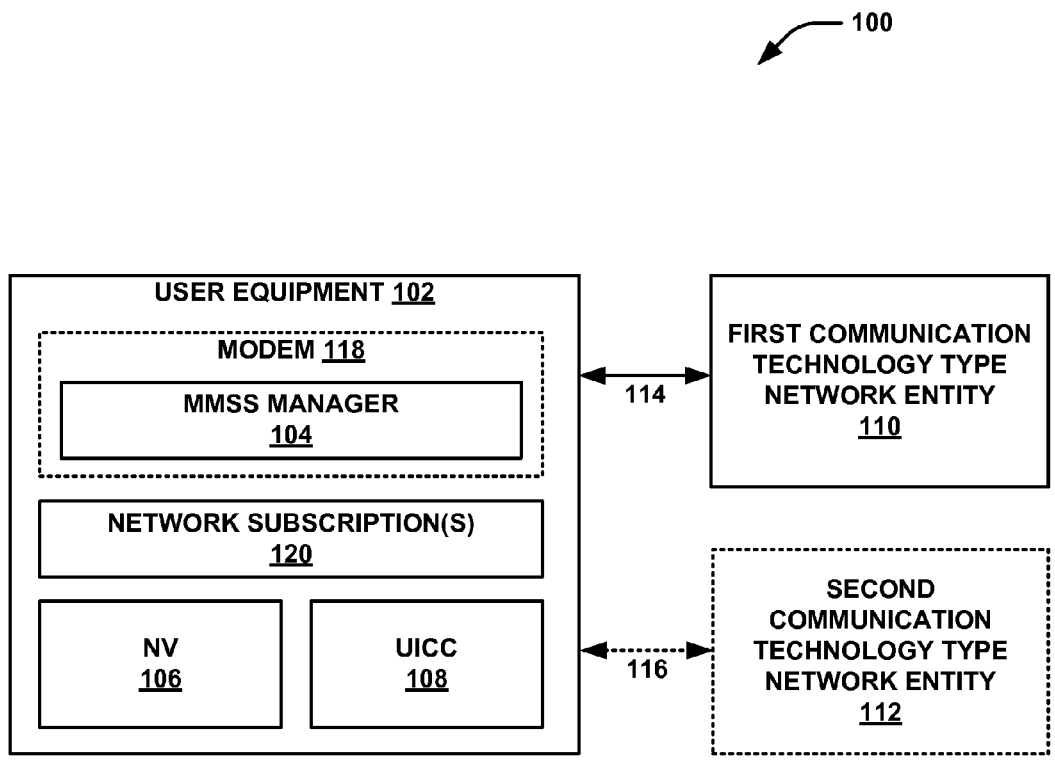
FIG. 1 is a system diagram of an example wireless system configured for multimode communication according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure relate to an algorithm by which a UE may determine when and how MMSS operation will be conducted at power-up of the UE or a UE-associated modem, over-the-air service provisioning (OTASP), and/or SIM or modem refresh. In an aspect, when the UE, or a modem associated with the UE, powers up or resets and the UE discovers that it contains a subscription for only one communication technology type network, the UE will not attempt to read MMSS provisioning information and will not start MMSS operation.

Where two or more communication technology type network subscriptions are available (e.g. 3GPP and 3GPP2), one of two possible scenarios may exist: (1) 3GPP2 (e.g., CDMA) subscription information is stored on the NV; (2) 3GPP2 subscription information is stored on the UICC. Where 3GPP2 subscription information is from the NV (Case 1), in an aspect, the UE may read MSPL, MLPL, and PLMN Selector information from the UICC, but may read the PRL from the NV. Furthermore, the UE may commence MMSS operation from a combination of these files. Additionally, in the case that any of these files are not present in the NV or UICC or are incorrectly provisioned, the UE may halt any attempt to read the MMSS files and may fall back to single mode UE system selection operation and/or prompt the user with an error message. Alternatively, where 3GPP2 subscription information is from the UICC (Case 2), in an aspect, the UE may read PRL, MSPL, MLPL, and PLMN Selector information from the UICC, and may start MMSS operation from a combination of these files. Again, in the case that any of these files are not present in the NV or UICC or are incorrectly provisioned, the UE may halt any attempt to read the MMSS files and may fall back to single mode UE system selection operation and/or prompt the user with an error message.

Aspects of the present invention are additionally based on several assumptions. First, it is assumed that PLMN Selector, MSPL, and MLPL information will always be found on the UICC. Additionally, it is assumed that 3GPP subscription information will always be stored on the UICC. Furthermore, it is assumed that 3GPP2 subscription information and PRL information can be stored either on the UICC or the NV.

In summary, where the UE contains only one available communication technology type network subscription (e.g. one of 3GPP and 3GPP2) available at UE or modem power up or reset, the UE may not read MMSS information from the UICC or NV, thus avoiding unnecessary file reads and saving power at these junctures. Additionally, by allowing these files to be stored in either the NV or the UICC, the invention provides more flexibility in where the MMSS files are stored.

FIG. 1 illustrates an example communications system 100 configured to facilitate multimode communication between one or more UEs 102 and one or more of a first communication technology type network entity 110 and a second communication technology type network entity (or more communication technology type network entities). In an aspect, first communication technology type network entity 110 may communicate with UE 102 using a first communication technology via communication link 114, which may be a wireless link. Furthermore, UE 102 may communicate with second communication technology type network entity 112 using a second communication technology via communication link 116, which may be a wireless link. In an aspect, the first and/or second communication technologies may include, but are not limited to, one or more of a 3GPP communication technology standard and a 3GPP2 communication technology standard. Furthermore, UE 102 may contain one or more network subscriptions 120, which may correspond to one or more specific networks or one or more communication technology type networks with which UE 102 is subscribed or otherwise permitted to communicate. In an aspect, the one or more network subscriptions 120 may be stored on a memory component of UE 102 (e.g. memory 304, FIG. 3) In some examples, the one or more network subscriptions 120 may comprise one or more of 3GPP communication technologies and 3GPP2 communication technologies, or one or more networks utilizing these communication technologies.

For purposes of the present disclosure, the terms "3GPP standard(s)," "3GPP protocol(s)," "3GPP communication technology standard," "3GPP communication technology," and the like may refer to communication technology standards promulgated by the Third Generation Partnership Project; the term "3GPP network(s)" may refer to network(s) or associated network entities that are configured to communicate with UEs and/or other network devices according to one or more 3GPP communication technology standards; and "3GPP network subscription" may refer to a subscription that a UE may contain, include, obtain, or otherwise possess, which allows the UE to communicate with one or more networks that are configured to communicate via one or more 3GPP communication technology standards. These 3GPP communication technology standards may include, but are not limited to, one or more of: Global System for Mobile Communications (GSM), Wideband Code Division Multiple Access (WCDMA), Circuit Switched Data (CSD), High-Speed Circuit-Switched Data (HSCSD), General Packet Radio Service (GPRS), Enhanced Data Rates for GSM Evolution (EDGE), Enhanced General Packet Radio Service (EGPRS), Universal Mobile Telecommunications System (UMTS), UMTS-Frequency-Division Duplexing (UMTS-FDD), High-Speed Packet Access (HSPA), Evolved HSPA (HSPA+), Long-Term Evolution (LTE), LTE Advanced, and any other communication technology protocol or type classified as a 3GPP communication technology.

Likewise, for purposes of the present disclosure, the terms "3GPP2 standard(s)," "3GPP2 protocol(s)," "3GPP2 communication technology standard," "3GPP2 communication technology," and the like may refer to communication technology standards promulgated by the Third Generation Partnership Project 2; the term "3GPP2 network(s)" may refer to network(s) or associated network entities that are configured to communicate with UEs and/or other network devices according to one or more 3GPP2 communication technology standards; and "3GPP2 network subscription" may refer to a subscription that a UE may contain, include, obtain, or otherwise possess, which allows the UE to communicate with one or more networks that are configured to communicate via one or more 3GPP2 communication technology standards. These 3GPP2 communication technology standards may include, but are not limited to, one or more of: Code Division Multiple Access One (cdmaOne), CDMA2000, CDMA2000 1x-RTT (1x or 1x-RTT), CDMA 1X Advanced, CDMA2000 Evolution-Data Optimized (1xEV-DO), and any other communication technology standard, protocol, or type classified under 3GPP2 communication technology.

Furthermore, in an aspect, UE 102 may include an MMSS manager 104, which may be configured to manage MMSS operations of the UE 102. For example, MMSS manager may determine a storage location for one or more MMSS base files, which may include files for provisioning, MMSS setup, and/or files for MMSS operation on UE102. In an aspect, these one or more MMSS base files may be stored on a nonvolatile memory (NV) 106 and/or a UICC 108. In an aspect, the MMSS manager may also be configured to commence MMSS communication with first communication technology network and a second communication technology network via first communication technology network entity 110 and second communication technology network entity 112, respectively.

In an additional aspect, MMSS manager 104 may optionally be a component of a modem 118, which may be configured to control communicative functionality of the UE 102. For example, modem 118 may govern transmission and receiver scheduling associated with one or more radio resources (e.g. antenna(s), receiver(s), transmitter(s), transceiver(s), etc.) associated with UE 102 and/or may maintain one or more receive or transmit queues associated with the one or more radio resources (not shown).

Figure 2:
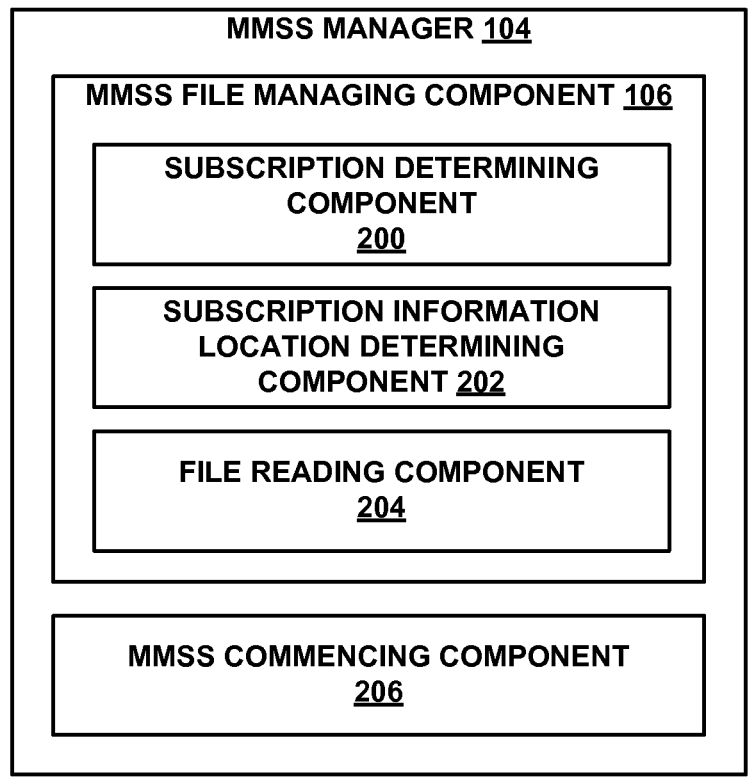
FIG. 2 is a block diagram of an example MMSS manager component of a UE according to example aspects of the present disclosure.

FIG. 2 presents an example MMSS manager 104 of FIG. 1. In an aspect, MMSS manager 104 may include an MMSS file managing component 106, which may be configured to determine a storage location of MMSS base files. In an aspect, these base files may include one or more of a Preferred Roaming List (PRL), a Public Land Mobile Network (PLMN) selector, MMSS System Priority List (MSPL), MMSS Location Associated Priority List (MLPL), or any other provisioning, set-up, communication-managing, or any other control information associated with MMSS operation or management in a wireless system. In an aspect, MMSS file managing component 106 may be configured to assume that PLMN, MSPL, and/or MLPL information is located and/or stored on the UICC, that any 3GPP subscription information is stored on the UICC, and that 3GPP subscription information and PRL information are stored on either the UICC or the NV.

In an aspect, MMSS file managing component 106 may include a subscription determining component 200, which may be configured to query internal components of a UE to determine whether the UE contains one or more 3GPP network subscriptions and/or one or more 3GPP2 network subscriptions. In an aspect, the UE may make such a determination by querying one or more memory components of the UE that may contain information identifying the types of networks to which the UE is subscribed. In a non-limiting aspect, the one or more memory components may include, but are not limited to, one or more of memory 304 (FIG. 3), UICC 108, NV 106, or any other memory component associated with UE 102.

Alternatively or additionally, the UE may receive such information by obtaining one or more messages pertaining to subscriptions possessed by the UE that may be received by the UE from an external device—for example, from a network entity such as a base station or NodeB. In such an aspect, upon power-up or restart of the UE (and/or its associated modem), the UE may broadcast (e.g. as a multicast or beacon signal) identifying information (e.g. an International Mobile Subscriber Identity (IMSI), International Mobile Equipment Identity (IMEI), Cell-Radio Network Temporary Identifier (C-RNTI), phone number, home network identifier, or any other identifier associated with the UE) to identify its presence to any in-range network entities. Upon receipt of such an identification signal, one or more network entities may perform a device lookup operation to determine whether the identifying information received from the UE corresponds to a subscriber to the network of the network entity and/or a full or partial list of the networks to which the UE is subscribed. In some examples, these one or more networks to which a particular UE contains a subscription may comprise one or more 3GPP networks and/or one or more 3GPP2 networks.

Furthermore, MMSS file managing component 106 may include a subscription information location determining component 202, which may be configured to determine whether one or more MMSS base files are stored on a UICC or on an NV associated with the UE. In some aspects, this location may be determined based on the location of 3GPP2 subscription information within the UE. Additionally, MMSS file managing component 106 may include a file reading component 204, which may be configured to read one or more MMSS base files from a memory device, such as a memory device comprising a UICC or an NV.

In an additional aspect, MMSS manager 104 may include an MMSS commencing component 206, which may be configured to select one or more available communication technology networks with which to communicate and to commence MMSS communication between the UE and the one or more available communication technology networks.

Figure 3:
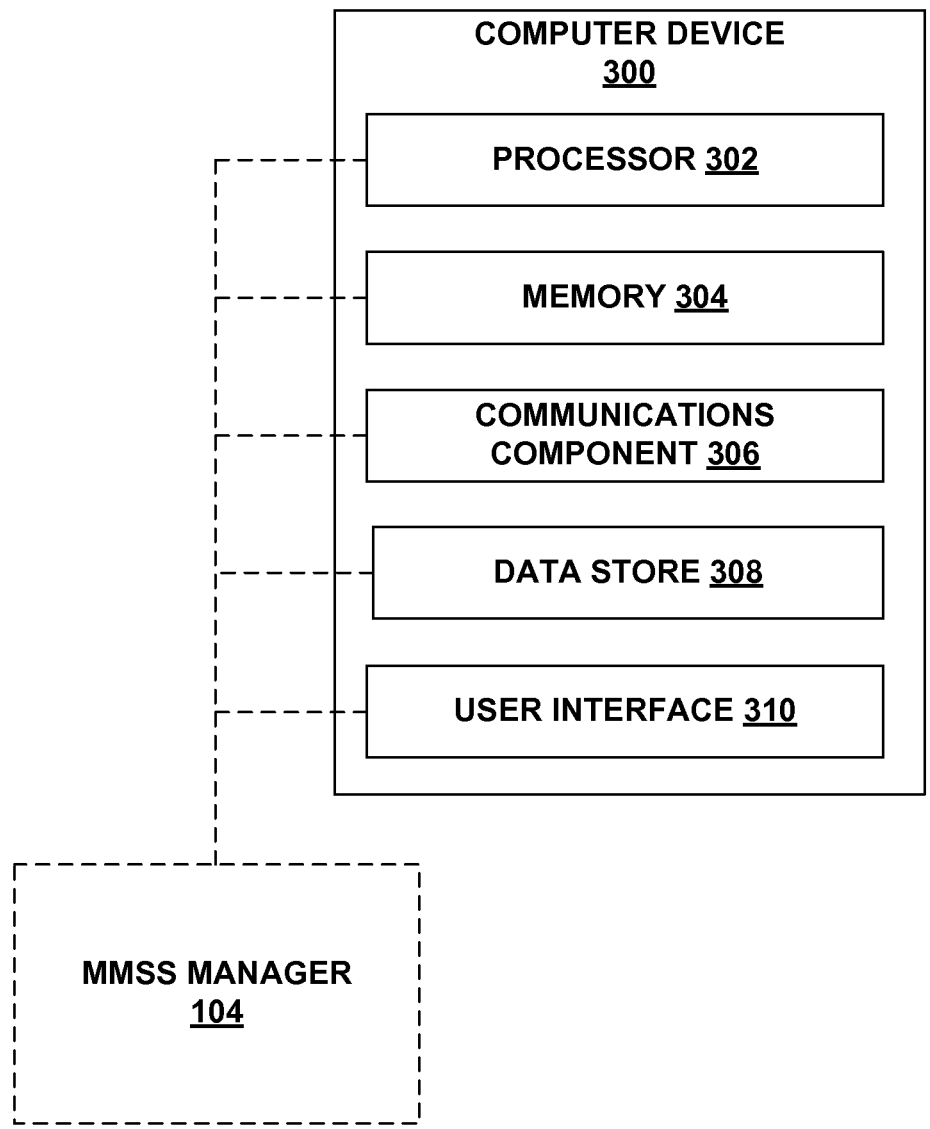
FIG. 3 is a block diagram of an example computer device according to the present disclosure.

Referring to FIG. 3, in one aspect, any of UE 102, first communication technology network entity 110, and/or second communication technology network entity 112 (FIG. 1) may be represented by computer device 300. Computer device 300 includes a processor 302 for carrying out processing functions associated with one or more of components and functions described herein. Processor 302 can include a single or multiple set of processors or multi-core processors. Moreover, processor 302 can be implemented as an integrated processing system and/or a distributed processing system.

Computer device 300 further includes a memory 304, such as for storing data used herein and/or local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof. Furthermore, memory 304 may contain information associated with the UE network subscription(s) 120.

Further, computer device 300 includes a communications component 306 that provides for establishing and maintaining communications with one or more parties utilizing hardware, software, and services as described herein. Communications component 74 may carry communications between components on computer device 300, as well as between computer device 300 and external devices, such as devices located across a communications network and/or devices serially or locally connected to computer device 300. For example, communications component 66 may include one or more buses, and may further include transmit chain components and receive chain components associated with a transmitter and receiver, respectively, operable for interfacing with external devices. In some non-limiting examples, communications component 306 may comprise modem 118 (FIG. 1).

Additionally, computer device 300 may further include a data store 308, which can be any suitable combination of hardware and/or software, that provides for mass storage of information, databases, and programs employed in connection with aspects described herein. For example, data store 308 may be a data repository for applications not currently being executed by processor 302. Furthermore, data store 308 may contain information associated with the UE network subscription(s) 120.

Computer device 300 may additionally include a user interface component 310 operable to receive inputs from a user of computer device 300, and further operable to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof. Additionally, in some aspects, computer device 300 may include reconciler MMSS manager (FIGS. 1 and 2), configured to manage MMSS operations of computer device 300.

Figure 4:
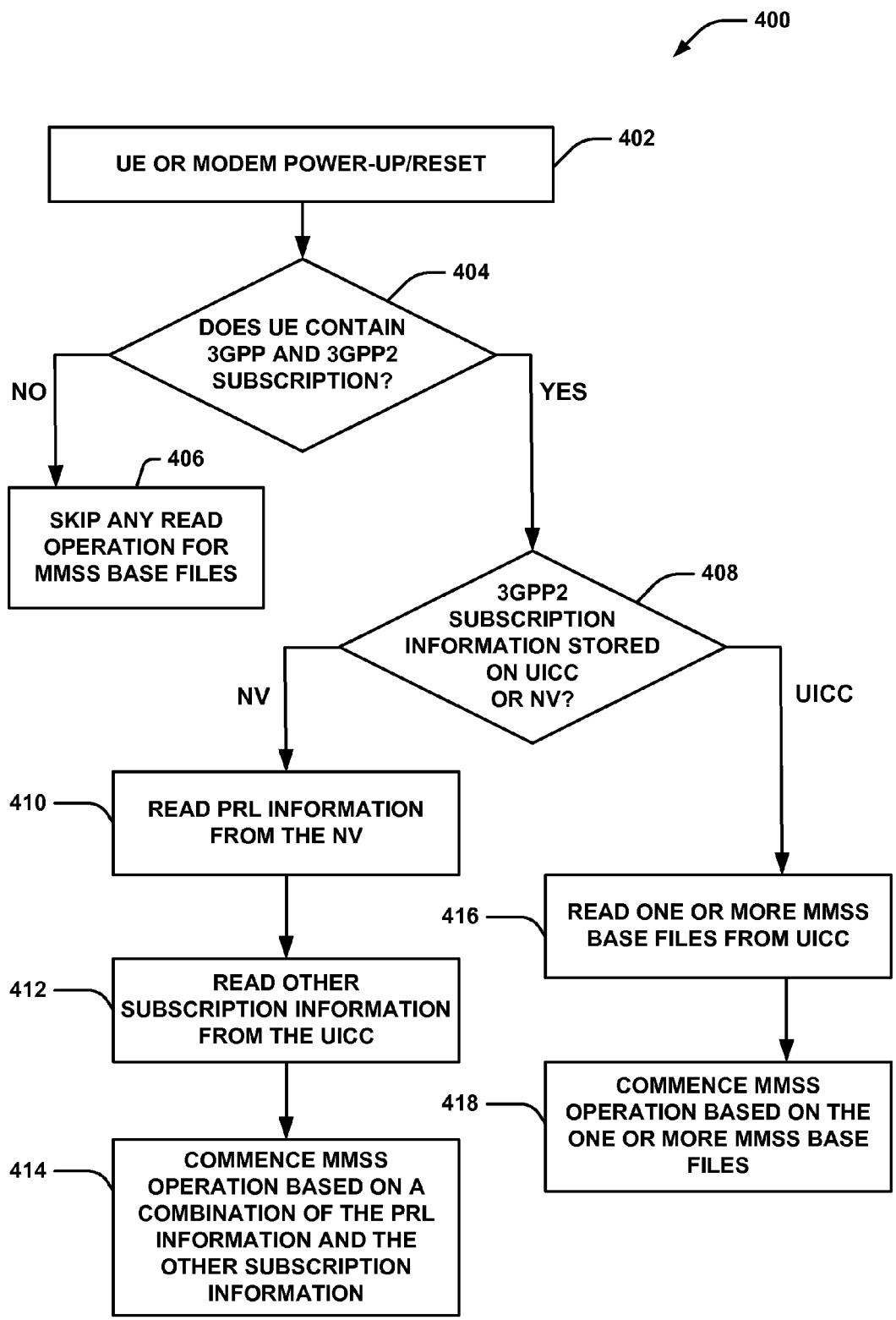
FIG. 4 is a flowchart of an example method for MMSS management according to example aspects of the present disclosure.

FIG. 4 presents an example methodology 400 for MMSS management in a UE. For example, at block 402, the UE (or associated modem) may be powered on or may reset. Upon power-on or reset, at block 404, the UE may discover whether it contains at least one 3GPP network subscription and at least one 3GPP2 network subscription, for example, according to methods outlined above in reference to subscription determining component 200 of FIG. 2. Furthermore, at block 406, the UE may skip any read operations for obtaining MMSS base files at a UICC or NV where the UE did not discover at least one of both a 3GPP and a 3GPP2 subscription possessed by the UE, because MMSS operation is unnecessary without at least one subscription to both communication technology type subscriptions.

On the other hand, where the UE discovers at least one of both a 3GPP and a 3GPP2 subscription associated with the UE at block 404, the UE may then determine whether 3GPP2 (e.g. CDMA) network subscription information for the UE is stored on the UICC or the NV at block 408. In an aspect, the UE may query a memory element for the location of the 3GPP2 network subscription information or may query the UICC and/or the NV to determine whether the 3GPP2 network subscription information is stored on the UICC or whether this information is stored on the NV.

In an aspect, where the UE determines that the 3GPP2 network subscription information is stored on the NV, the UE may read PRL information from the NV at block 412. Furthermore, at block 412, the UE can read other subscription information from the UICC. In a non-limiting example aspect, this other subscription information may include one or more of a PLMN selector, MSPL, MLPL, MMSS base file(s) and/or any other provisioning information or managing information associated with MMSS operation. In addition, at block 414, the UE may commence MMSS operation based on a combination of the PRL information and the other subscription information. In an aspect, at block 414, the commencing may include scanning for and/or selecting one or more available 3GPP communication technology type and/or 3GPP2 communication technology type networks with which to communicate.

Returning to block 408, in an aspect, where the UE determines that the UE stores 3GPP2 network information at the UICC, the UE may read one or more MMSS base files from the UICC. Again, in a non-limiting example aspect, these MMSS base files may include one or more of a PLMN selector, MSPL, MLPL, subscription information, and/or any other provisioning information or managing information associated with MMSS operation. In addition, at block 418, the UE may commence MMSS operation based on the one or more MMSS base files read from the UICC at block 416. In an aspect, at block 418, the commencing may include selecting one or more available 3GPP communication technology type and/or 3GPP2 communication technology type networks with which to communicate.

Figure 5:
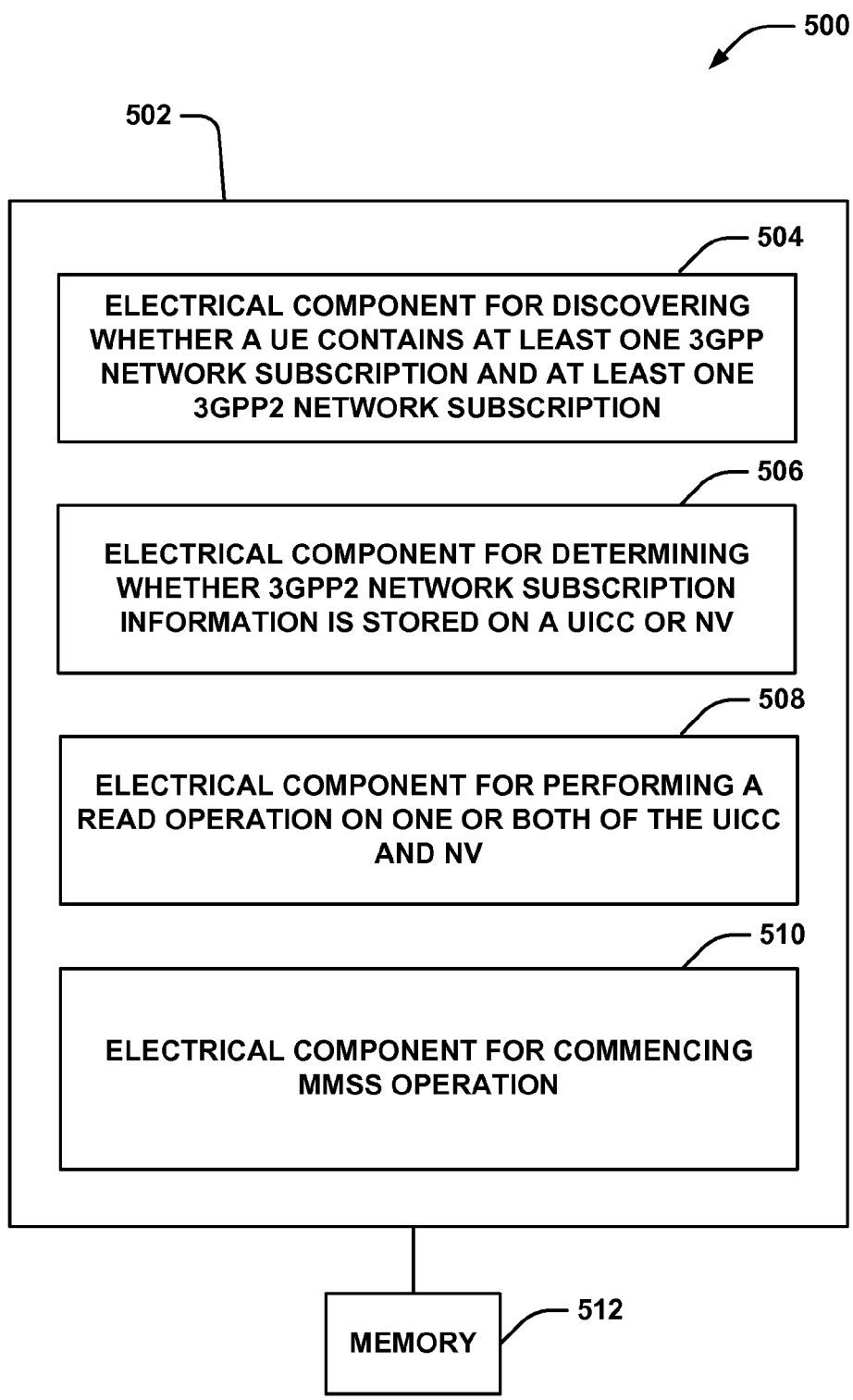
FIG. 5 is a block diagram illustrating a logical grouping of electrical components for managing MMSS according to the present disclosure.

Referring to FIG. 5, an example system 500 is displayed for managing MMSS operations is presented. For example, system 500 can reside at least partially within one or more UEs or network entities. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component 504 for discovering whether a UE contains at least one 3GPP network subscription and at least one 3GPP2 network subscription. In an aspect, electrical component 504 may comprise subscription determining component 200 (FIG. 2). Additionally, logical grouping 502 can include an electrical component 506 for determining whether 3GPP2 subscription information is stored on a UICC or NV. In an aspect, electrical component 506 may comprise subscription information location determining component 202 (FIG. 2). Furthermore, logical grouping 502 can include an electrical component 508 for performing a read operation on one or both of the UICC and NV. In an aspect, electrical component 508 may comprise file reading component 204 (FIG. 2). In addition, logical grouping 502 can include an electrical component 510 for commencing MMSS operation. In an aspect, electrical component 510 may comprise MMSS commencing component 206 (FIG. 2) and/or modem 118 (FIG. 1).

Additionally, system 500 can include a memory 512 that retains instructions for executing functions associated with the electrical components 504, 506, 508, and 510, stores data used or obtained by the electrical components 504, 506, 508, and 510, etc. While shown as being external to memory 512, it is to be understood that one or more of the electrical components 504, 506, 508, and 510 can exist within memory 512. In one example, electrical components 504, 506, 508, and 510 can comprise at least one processor, or each electrical component 504, 506, 508, and 510 can be a corresponding module of at least one processor. Moreover, in an additional or alternative example, electrical components 504, 506, 508, and 510 can be a computer program product including a computer readable medium, where each electrical component 504, 506, 508, and 510 can be corresponding code.

Figure 6:
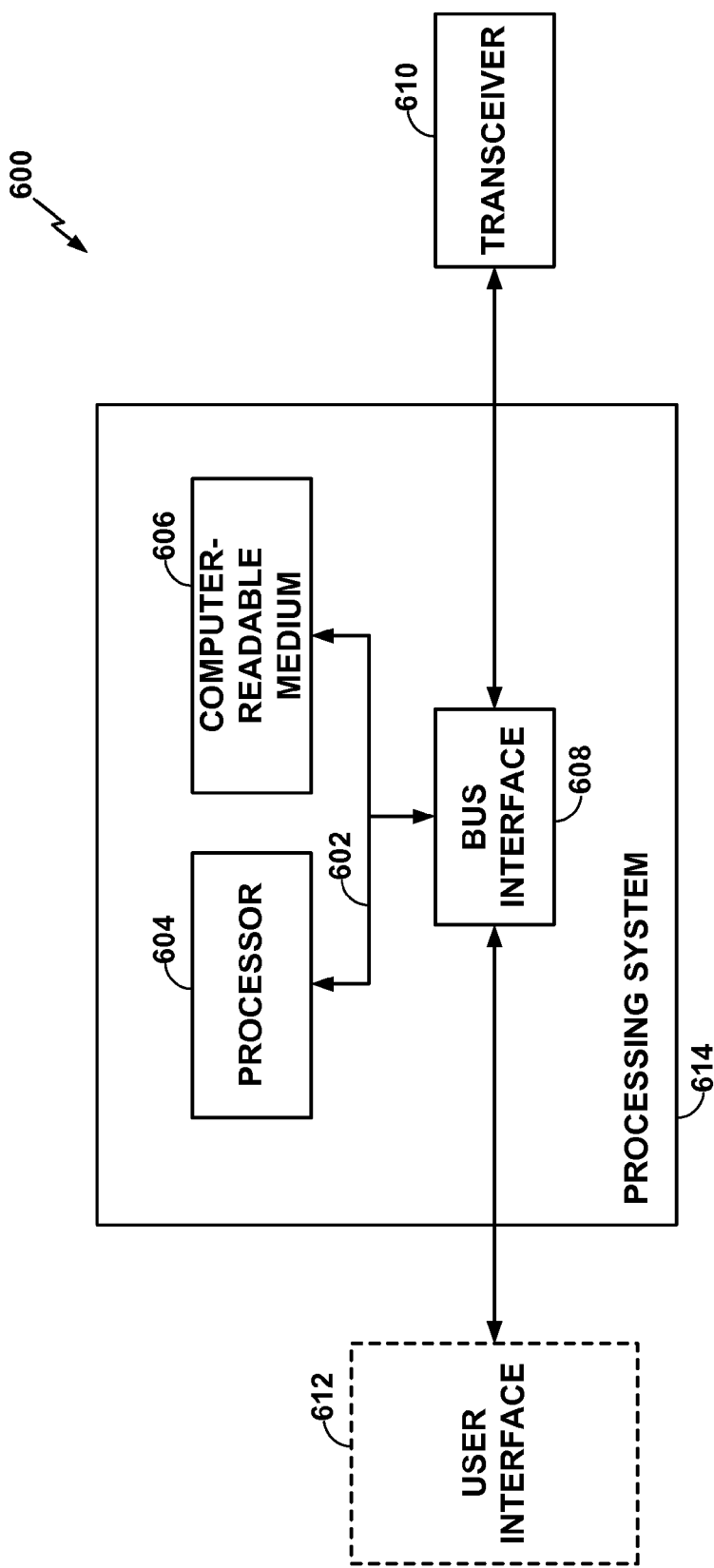
FIG. 6 is a block diagram illustrating an example of a hardware implementation for an apparatus of the present disclosure employing a processing system.

FIG. 6 is a block diagram illustrating an example of a hardware implementation for an apparatus 600 employing a processing system 614. For example, apparatus 600 may be specially programmed or otherwise configured to operate as UE 102, as described above, and may therefore be configured to perform functions presented herein for optimizing subscription information location and loading procedures for devices in multi-mode systems. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software. In an aspect, for example, processor 604 and/or computer-readable medium 606 may be specially programmed or otherwise configured to operate as UE 102, as described above.

Figure 7:
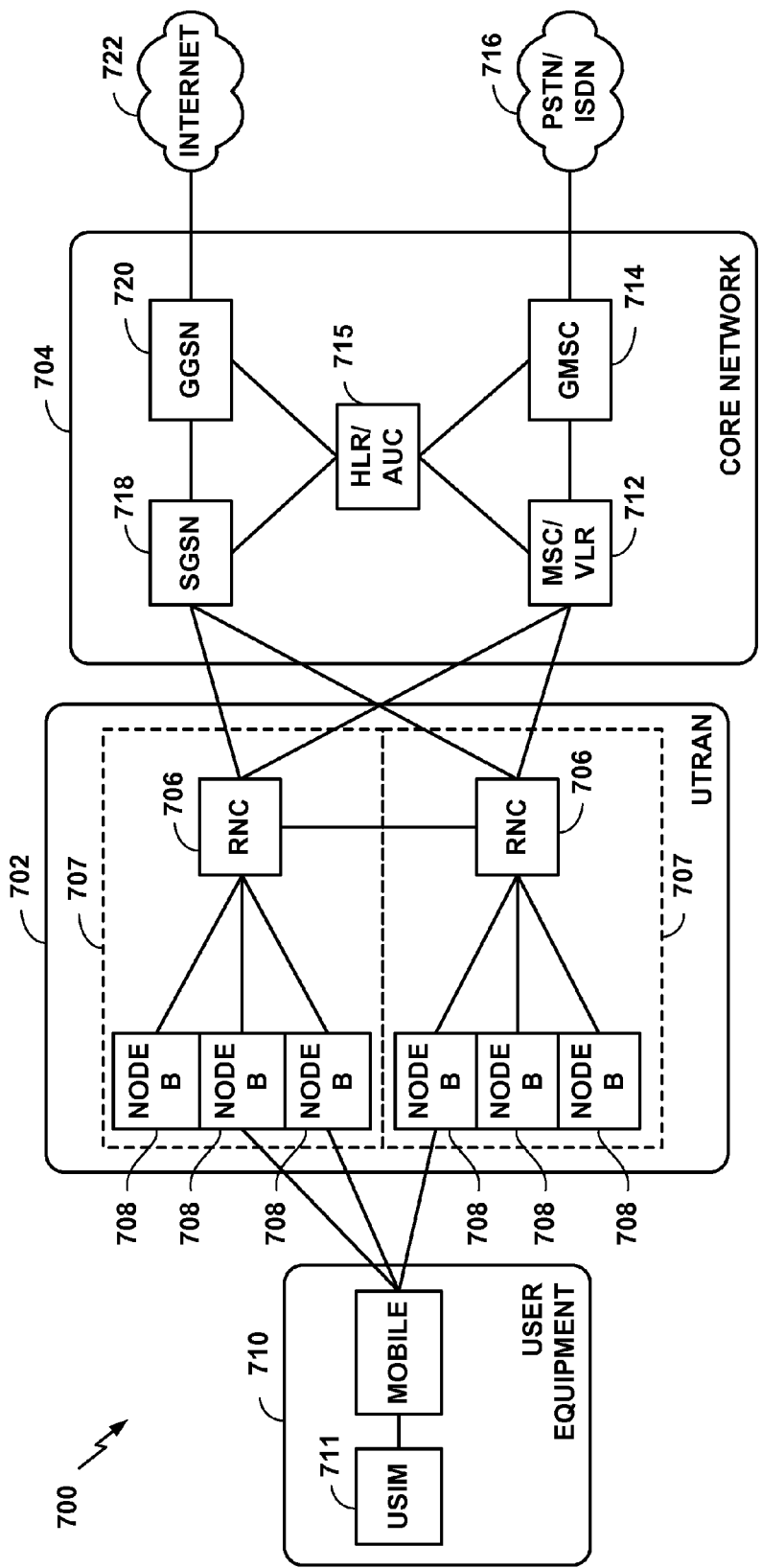
FIG. 7 is a block diagram conceptually illustrating an example of a telecommunications system including aspects of the present disclosure.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a WCDMA air interface. A UMTS network includes three interacting domains: a Core Network (CN) 704, a UMTS Terrestrial Radio Access Network (UTRAN) 702, and User Equipment (UE) 710. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a NodeB 708 may be considered as including a physical (PHY) layer and a medium access control (MAC) layer. Further, communication between a UE 710 and an RNC 706 by way of a respective NodeB 708 may be considered as including a radio resource control (RRC) layer. In the instant specification, the PHY layer may be considered layer 1; the MAC layer may be considered layer 7; and the RRC layer may be considered layer 3. Information hereinbelow utilizes terminology introduced in the RRC Protocol Specification, 3GPP TS 75.331 v9.1.0, incorporated herein by reference. Further, for example, UE 710 and NodeBs 708 and/or RNCs 706 respectively may be specially programmed or otherwise configured to operate as UE 102 and/or first or second communication technology networks 110 and 112, respectively, as described above with reference to FIG. 1.

The geographic region covered by the RNS 707 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 708 are shown in each RNS 707; however, the RNSs 707 may include any number of wireless NodeBs. The NodeBs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the NodeBs 708. The DL, also called the forward link, refers to the communication link from a NodeB 708 to a UE 710, and the UL, also called the reverse link, refers to the communication link from a UE 710 to a NodeB 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" WCDMA air interface for UMTS is based on such direct sequence spread spectrum technology and additionally calls for a frequency division duplexing (FDD). FDD uses a different carrier frequency for the UL and DL between a NodeB 708 and a UE 710. Another air interface for UMTS that utilizes DS-CDMA, and uses time division duplexing (TDD), is the TD-SCDMA air interface. Those skilled in the art will recognize that although various examples described herein may refer to a WCDMA air interface, the underlying principles may be equally applicable to a TD-SCDMA air interface.

An HSPA air interface includes a series of enhancements to the 3G/WCDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the NodeB 708 over the HS-DPCCH to indicate whether it correctly decoded a packet on the downlink.

HS-DPCCH further includes feedback signaling from the UE 710 to assist the NodeB 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the NodeB 708 and/or the UE 710 may have multiple antennas supporting MIMO technology. The use of MIMO technology enables the NodeB 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the NodeB 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
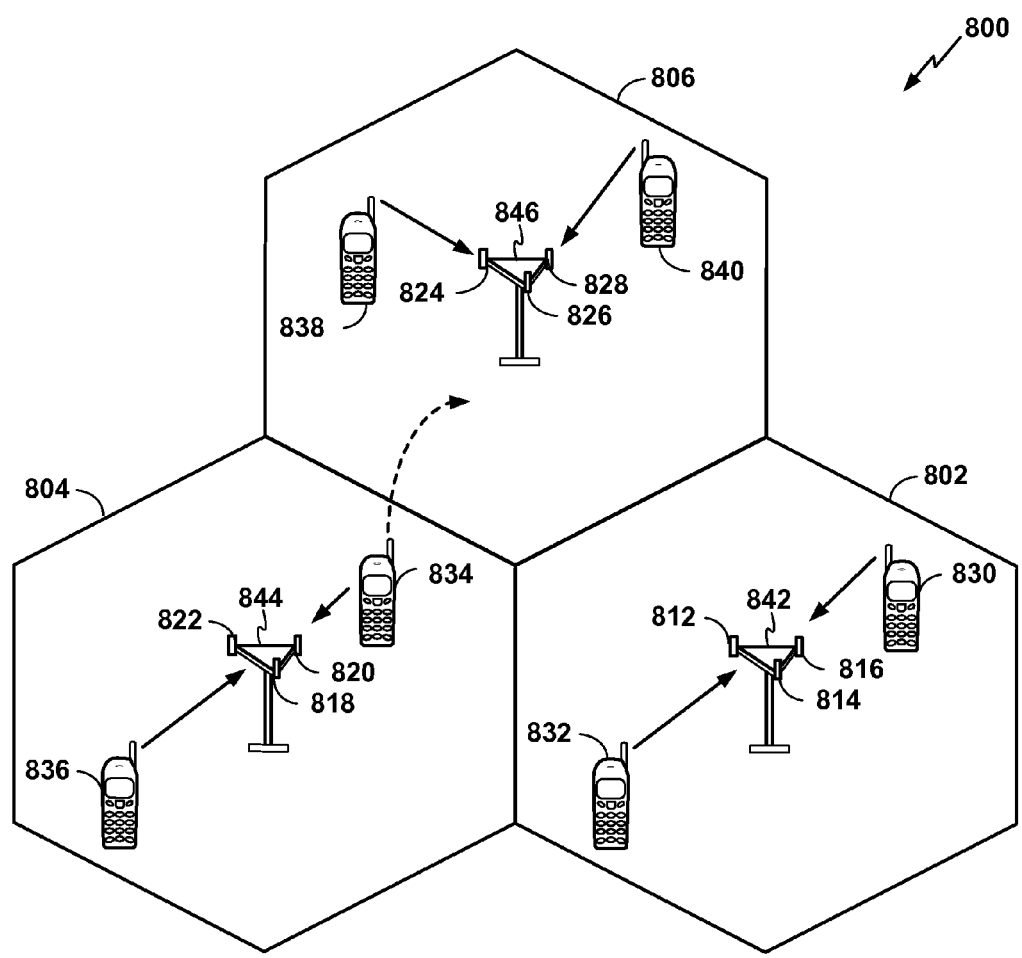
FIG. 8 is a conceptual diagram illustrating an example of an access network including aspects of the present disclosure.

Referring to FIG. 8, an access network 800 in a UTRAN architecture is illustrated. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, (e.g., UEs, such as UE 102 of FIG. 1), which may be in communication with one or more sectors of each cell 802, 804 or 806. For example, UEs 830 and 832 may be in communication with NodeB 842, UEs 834 and 836 may be in communication with NodeB 844, and UEs 838 and 840 can be in communication with NodeB 846. Here, each NodeB 842, 844, 846 is configured to provide an access point to a CN 704 (see FIG. 7) for all the UEs 830, 832, 834, 836, 838, 840 in the respective cells 802, 804, and 806. For example, in an aspect, the UEs and NodeBs of FIGS. 7 and/or 8 may be specially programmed or otherwise configured to operate as UE 102 and/or first or second communication technology networks 110 and 112, respectively, as described above.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the NodeBs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (WCDMA) and other variants of CDMA, such as TD-SCDMA; Global System for Mobile Communications (GSM) employing TDMA; and Evolved UTRA (E-UTRA), Ultra Mobile Broadband (UMB), IEEE 602.11 (Wi-Fi), IEEE 602.16 (WiMAX), IEEE 602.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
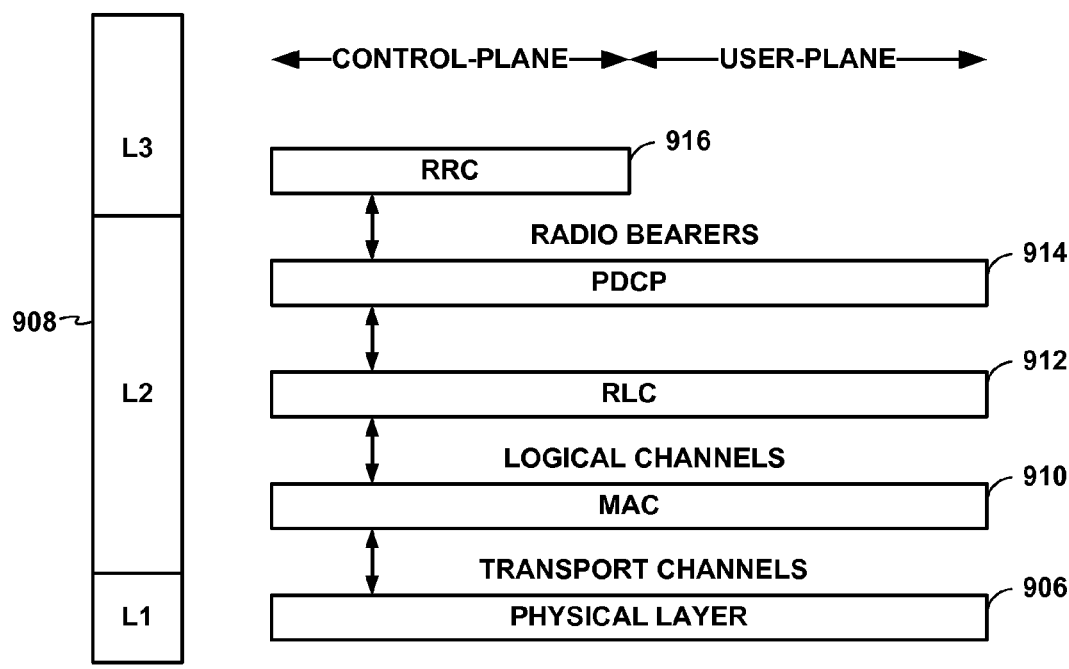
FIG. 9 is a conceptual diagram illustrating an example of a radio protocol architecture for the user and control plane implemented by components of the present disclosure.

The radio protocol architecture may take on various forms depending on the particular application. An example for an HSPA system will now be presented with reference to FIG. 9. FIG. 9 is a conceptual diagram illustrating an example of the radio protocol architecture for the user and control planes.

Referring to FIG. 9, the radio protocol architecture for the UE and NodeB is shown with three layers: Layer 1, Layer 2, and Layer 3. Layer 1 is the lowest lower and implements various physical layer signal processing functions. Layer 1 will be referred to herein as the physical layer 906. Layer 2 (L2 layer) 908 is above the physical layer 906 and is responsible for the link between the UE and NodeB (e.g. UE 102 and first communication technology type network entity 110 and/ or second communication technology type network entity 112 of FIG. 1, respectively) over the physical layer 906. For example, the UE and NodeB corresponding to the radio protocol architecture of FIG. 9 may be specially programmed or otherwise configured to operate as UE 102 and/or first or second communication technology networks 110 and 112, respectively, as described above.

In the user plane, the L2 layer 908 includes a media access control (MAC) sublayer 910, a radio link control (RLC) sublayer 912, and a packet data convergence protocol (PDCP) 914 sublayer, which are terminated at the NodeB on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between NodeBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

Figure 10:
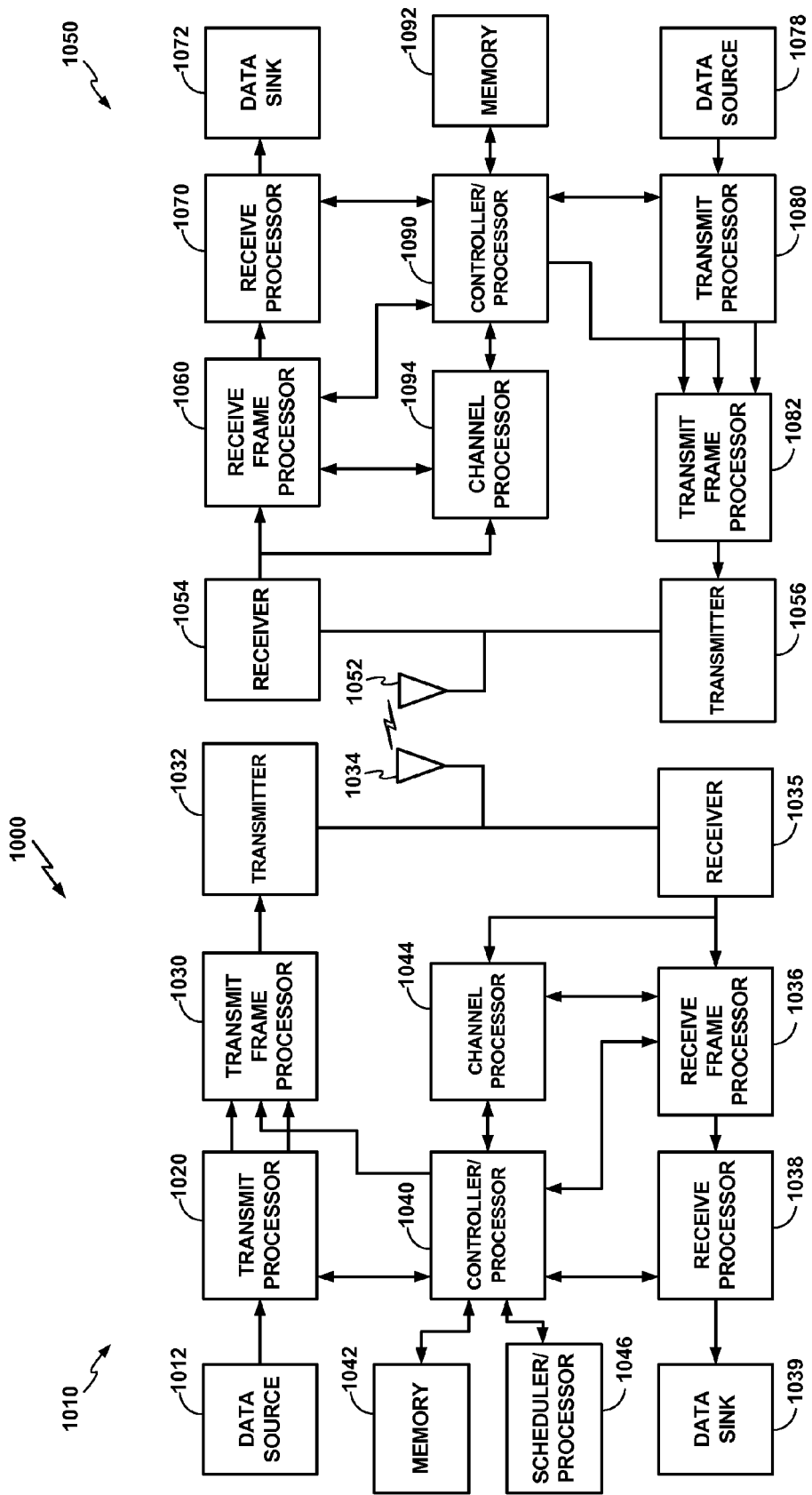
FIG. 10 is a block diagram conceptually illustrating an example of a NodeB in communication with a UE in a telecommunications system, including aspects of the present disclosure.

FIG. 10 is a block diagram of a NodeB 1010 in communication with a UE 1050. For example, UE 1050 and NodeB 1010 respectively may be specially programmed or otherwise configured to operate as UE 102 and/or first or second communication technology networks 110 and 112, respectively, as described above in reference to FIG. 1. Further, for example, the NodeB 1010 may be the NodeB 708 in FIG. 7, and the UE 1050 may be the UE 710 in FIG. 7. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the NodeB 1010. More specifically, the receive processor 1070 descrambles and despreads the symbols, and then determines the most likely signal constellation points transmitted by the NodeB 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the NodeB 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the NodeB 1010 or from feedback contained in the midamble transmitted by the NodeB 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the NodeB 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the NodeB 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the NodeB 1010 and the UE 1050, respectively. A scheduler/processor 1046 at the NodeB 1010 may be used to allocate resources to the UEs and schedule downlink and/or uplink transmissions for the UEs.

Several aspects of a telecommunications system have been presented with reference to a WCDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 602.11 (Wi-Fi), IEEE 602.16 (WiMAX), IEEE 602.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Further, unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for device provisioning, comprising:
    discovering that a user equipment (UE) contains at least one 3GPP network subscription and at least one 3GPP2 network subscription;
    determining, based on discovering that the UE contains at least one 3GPP network subscription and at least one 3GPP2network subscription, a storage location of 3GPP2 network subscription information, wherein the UE comprises a Universal Integrated Circuit Card (UICC) and a nonvolatile memory (NV), and wherein the storage location of the 3GPP2 network subscription information comprises one of the UICC or the NV; and
    performing, based on determining that the storage location is the NV, a read operation on both of the UICC and NV to obtain one or more Multimode System Selection (MMSS) base files.

2. The method of claim 1, wherein the 3GPP2 network subscription information comprises Code Division Multiple Access (CDMA) subscription information.

3. The method of claim 1, further comprising, where the storage location is the NV:
    reading Preferred Roaming List (PRL) information from the NV; and
    reading other subscription information from the UICC; and
    commencing MMSS operation based on a combination of the PRL information and the other subscription information.

4. The method of claim 3, wherein the other subscription information includes one or more of Public Land Mobile Network (PLMN) Selector, MMSS System Priority List (MSPL), and MMSS Location Associated Priority List (MLPL) information.

5. The method of claim 1, further comprising, where the storage location is the UICC:
    reading one or more MMSS base files from the UICC; and
    commencing MMSS operation based on a combination of the one or more MMSS base files.

6. The method of claim 5, wherein the one or more MMSS base files comprise one or more of Preferred Roaming List (PRL), Public Land Mobile Network (PLMN) Selector, MMSS System Priority List (MSPL), and MMSS Location Associated Priority List (MLPL) information.

7. An apparatus for device provisioning, comprising:
    means for discovering that a user equipment (UE) contains at least one 3GPP network subscription and at least one 3GPP2 network subscription;
    means for determining, based on discovering that the UE contains at least one 3GPP network subscription and at least one 3GPP2 network subscription, a storage location of 3GPP2 network subscription information, wherein the UE comprises a Universal Integrated Circuit Card (UICC) and a nonvolatile memory (NV), and wherein the storage location of the 3GPP2 network subscription information comprises one of the UICC or the NV; and
    means for performing, based on determining that the storage location is the NV, a read operation on both of the UICC and NV to obtain one or more Multimode System Selection (MMSS) base files.

8. The apparatus of claim 7, wherein the 3GPP2 network subscription information comprises Code Division Multiple Access (CDMA) subscription information.

9. The apparatus of claim 7, further comprising, where the storage location the NV:

means for reading Preferred Roaming List (PRL) information from the NV; and means for reading other subscription information from the UICC; and means for commencing MMSS operation based on a combination of the PRL information and the other subscription information.

10. The apparatus of claim 7, wherein the other subscription information includes one or more of Public Land Mobile Network (PLMN) Selector, MMSS System Priority List (MSPL), and MMSS Location Associated Priority List (MLPL) information.

11. The apparatus of claim 7, further comprising, where the storage location is the UICC:

means for reading one or more MMSS base files from the UICC; and means for commencing MMSS operation based on a combination of the one or more MMSS base files.

12. The apparatus of claim 11, wherein the one or more MMSS base files comprise one or more of Preferred Roaming List (PRL), Public Land Mobile Network (PLMN) Selector, MMSS System Priority List (MSPL), and MMSS Location Associated Priority List (MLPL) information.

13. A non-transitory computer-readable medium storing computer executable code, comprising:

code for discovering whether a user equipment (UE) contains at least one 3GPP network subscription and at least one 3GPP2 network subscription;

code for determining, based on discovering that the UE contains at least one 3GPP network subscription and at least one 3GPP2 network subscription, a storage location of 3GPP2 network subscription information, wherein the UE comprises a Universal Integrated Circuit Card (UICC) and a nonvolatile memory (NV), and wherein the storage location of the 3GPP2 network subscription information comprises one of the UICC or the NV; and code for performing, based on determining that the storage location is the NV, a read operation on both of the UICC and NV to obtain one or more Multimode System Selection (MMSS) base files.

14. The non-transitory computer-readable medium of claim 13, wherein the 3GPP2 network subscription information comprises Code Division Multiple Access (CDMA) subscription information.

15. The non-transitory computer-readable medium of claim 13, the computer executable code comprising:

code for reading Preferred Roaming List (PRL) information from the NV where the storage location is the NV;

code for reading other subscription information from the UICC where the storage location is the NV; and code for commencing MMSS operation based on a combination of the PRL information and the other subscription information.

16. The non-transitory computer-readable medium of claim 15, wherein the other subscription information includes one or more of Public Land Mobile Network (PLMN) Selector, MMSS System Priority List (MSPL), and MMSS Location Associated Priority List (MLPL) information.

17. The non-transitory computer-readable medium of claim 13, the computer executable code comprising:

code for reading one or more MMSS base files from the UICC where the storage location is the UICC; and code for commencing MMSS operation based on a combination of the one or more MMSS base files.

18. The non-transitory computer-readable medium of claim 17, wherein the one or more MMSS base files comprise one or more of Preferred Roaming List (PRL), Public Land Mobile Network (PLMN) Selector, MMSS System Priority List (MSPL), and MMSS Location Associated Priority List (MLPL) information.

19. An apparatus for device provisioning, comprising:

subscription determining component configured to discover that a user equipment (UE) contains at least one 3GPP network subscription and at least one 3GPP2 network subscription;

a subscription information location determining component configured to determine, based on the subscription determining component discovering that the UE contains at least one 3GPP2 network subscription, a storage location of 3GPP2 network subscription information, wherein the UE comprises a Universal Integrated Circuit Card (UICC) and a nonvolatile memory (NV), and wherein the storage location of the 3GPP2 network subscription information comprises one of the UICC or the NV; and a file reading component configured to perform, based on the subscription information location determining component determining that the storage location is the NV, a read operation on both of the UICC and NV to obtain one or more Multimode System Selection (MMSS) base files.

20. The apparatus of claim 19, wherein the 3GPP2 network subscription information comprises Code Division Multiple Access (CDMA) subscription information.

21. The apparatus of claim 19, wherein, where the storage location is the NV, the file reading component is further configured to:

read Preferred Roaming List (PRL) information from the NV; and read other subscription information from the UICC; and further comprising an MMSS commencing component configured to commence MMSS operation based on a combination of the PRL information and the other subscription information.

22. The apparatus of claim 21, wherein the other subscription information. includes one or more of Public Land Mobile Network (PLMN) Selector, MMSS System Priority List (MSPL), and MMSS Location Associated Priority List (MLPL) information.

23. The apparatus of claim 19, wherein, where the storage location is the UICC, the file reading component is further configured to read one or more MMSS base files from the UICC; and further comprising an MMSS commencing component configured to commence MMSS operation based on a combination of the one or more MMSS base files.

24. The apparatus of claim 23, wherein the one or more MMSS base files comprise one or more of Preferred Roaming List (PRL), Public Land Mobile Network (PLMN) Selector, MMSS System Priority List (MSPL), and MMSS Location Associated Priority List (MLPL) information.

* * * * *